(12) United States Patent
Sood et al.

(10) Patent No.: US 12,218,926 B2
(45) Date of Patent: Feb. 4, 2025

(54) TIME CONSTRAINED ELECTRONIC REQUEST EVALUATION

(71) Applicant: PayPal, Inc., San Jose, CA (US)

(72) Inventors: Vishal Sood, Bangalore (IN); Yegya Narayanan Gopala Krishnan, Chennai (IN); Sudhindra Murthy, Bangalore (IN); Vidya Sagar Durga, Bangalore (IN); Chirag Gupta, Bangalore (IN)

(73) Assignee: PayPal, Inc., San Jose, CA (US)

( * ) Notice: Subject to any disclaimer, the term of this patent is extended or adjusted under 35 U.S.C. 154(b) by 796 days.

(21) Appl. No.: 17/399,300

(22) Filed: Aug. 11, 2021

(65) Prior Publication Data
US 2022/0417229 A1    Dec. 29, 2022

(30) Foreign Application Priority Data
Jun. 29, 2021 (IN) .............................. 202141029163

(51) Int. Cl.
*G06N 20/00* (2019.01)
*H04L 9/40* (2022.01)
*H04L 29/06* (2006.01)

(52) U.S. Cl.
CPC ............. *H04L 63/08* (2013.01); *G06N 20/00* (2019.01)

(58) Field of Classification Search
CPC .................................. H04L 63/08; G06N 20/00
See application file for complete search history.

(56) References Cited

U.S. PATENT DOCUMENTS

| | | | |
|---|---|---|---|
| 7,668,776 B1 * | 2/2010 | Ahles ................... | G06Q 20/108 705/42 |
| 8,225,387 B2 | 7/2012 | Mardikar et al. | |
| 10,986,123 B2 | 4/2021 | Wardman et al. | |
| 11,276,023 B1 * | 3/2022 | Butler ................... | G06N 20/00 |
| 11,748,757 B1 * | 9/2023 | Segal ................... | H04W 12/12 705/44 |
| 2010/0161399 A1 | 6/2010 | Posner et al. | |
| 2017/0109509 A1 | 4/2017 | Baghdasaryan | |
| 2018/0240107 A1 * | 8/2018 | Andrade .............. | G06Q 20/065 |
| 2018/0341758 A1 | 11/2018 | Park et al. | |

(Continued)

*Primary Examiner* — Joseph P Hirl
*Assistant Examiner* — Thomas A Gyorfi
(74) *Attorney, Agent, or Firm* — Kowert, Hood, Munyon, Rankin & Goetzel, P.C.; Catherine L. Gerhardt; Dean M. Munyon (57) ABSTRACT

Techniques are disclosed for time constrained electronic request evaluation. A server system receives, from a computing device, a request submitted via an account, including a first set of characteristics associated with the request. The system executes a first machine-learning model to determine a first risk score for the request by inputting the first set of characteristics into the first model. The system generates an initial authentication decision for the request based on the first score and sends the decision to the device. The system executes a second, different machine-learning model to determine a second risk score for the request, by inputting the first set of characteristics and a second, different set of characteristics associated with the account into the second model. Based on the second score, the system determines a final authentication decision. The disclosed techniques may advantageously improve computer security and operations via identification of malicious electronic requests.

20 Claims, 6 Drawing Sheets

(56) References Cited

U.S. PATENT DOCUMENTS

| | | | |
|---|---|---|---|
| 2019/0295088 A1 | 9/2019 | Jia et al. | |
| 2020/0211019 A1* | 7/2020 | Allbright | G06N 20/10 |
| 2020/0211022 A1* | 7/2020 | Allbright | H04L 63/1408 |
| 2020/0372509 A1* | 11/2020 | Phalnikar | G06N 5/01 |
| 2021/0067548 A1* | 3/2021 | Brandt | H04L 63/1466 |
| 2021/0248610 A1* | 8/2021 | Kurani | G06N 20/10 |
| 2021/0250342 A1* | 8/2021 | Budman | H04L 63/1433 |

* cited by examiner

Method 500

Receive from a computing device, a request submitted via a user account, the request including a first set of characteristics associated with the request.
510

Execute a first machine-learning based model to determine a first risk score for the request, where the first risk score is determined by inputting the first set of characteristics into the first machine-learning based model.
520

Send to the computing device, an initial authentication decision for the request, where the initial authentication decision is generated based on the first risk score.
530

Execute a second, different machine-learning based model to determine a second risk score for the request, where the second risk score is determined by inputting the first set of characteristics and a second, different set of characteristics associated with the user account into the second machine-learning based model.
540

Determine a final authentication decision based on the second risk score.
550

TIME CONSTRAINED ELECTRONIC REQUEST EVALUATION

RELATED APPLICATIONS

The present application claims priority under 35 U.S.C. § 119 to Indian patent application 202141029163, filed Jun. 29, 2021, the disclosure of which is incorporated by reference herein in its entirety.

BACKGROUND

Technical Field

This disclosure relates generally to risk detection, and, more specifically, to techniques for automatically detecting anomalous behavior e.g., for transaction security.

Description of the Related Art

As more and more transactions are conducted electronically via online transaction processing systems, for example, these processing systems become more robust in detecting suspicious and unusual behavior. Many transaction requests for a computer system may be malicious in intent, resulting in wasted computer resources, network bandwidth, storage, CPU processing, etc., if those transactions are processed. Such requests may also, if processed, bypass one or more computer security measures implemented by the computer system.

DETAILED DESCRIPTION

Security systems often perform electronic transaction evaluations for requests from various entities using different anomaly detection methods. For example, transaction processing systems are generally configured to identify unusual characteristics associated with the millions of transactions they process daily. Such anomaly detection methods, however, are often time intensive, leading to a delay in responding to requests for authentication, which in turn may lead to a negative user interaction experience. For example, if a user is required to wait more than a threshold amount of time (e.g., 250 milliseconds) to access an electronic resource, complete an electronic transaction, etc., their efficient use of a computer system may be impaired. As the amount of data available for anomaly detection and the complexity of anomaly detection models increases, the execution time necessary to make a security decision increases. As one specific example, a complex anomaly detection model may require upwards of five seconds of execution time. In some situations, a delay in decision making due to the slowness of security systems may even cause loss to the entity submitting the request, e.g., when the request is for an electronic transaction. This delay becomes increasingly problematic when the request for which anomaly detection is being performed is time-sensitive.

The disclosed techniques provide for complex anomaly detection in time-sensitive scenarios. In particular, the disclosed techniques implement two different anomaly detection models for a given request. At the time a request is received by a security system, the disclosed techniques execute a first machine-learning based model to determine a first risk score for the request based on a small set of data associated with the request. Based on this first risk score, an initial authentication decision is made. The disclosed techniques also execute a second, different machine learning model to determine a second risk score for the request based on a larger set of data associated with an account from which the request originated. The disclosed techniques then determine a final authentication decision for the request based on the second risk score. The final authentication decision may match the initial authentication decision or may contradict and, e.g., overrule the initial authentication decision. As one specific example, if the initial authentication decision authorizes a transaction, but the final authentication decision denies the transaction, the disclosed system may reverse (e.g., cancel) the transaction.

The disclosed multi-model risk detection system may advantageously identify and prevent fraudulent behavior while maintaining (or improving) a positive user experience. For example, the disclosed risk detection techniques allow for the use of advanced machine-learning based models that have a high catch rate while decreasing the time needed to provide decisions for a user request, which in turn improves user experience. The disclosed techniques may advantageously detect malicious transaction requests shortly after they are presented to a computer system, in order to provide enhanced computer system security and, in turn, improve system operations by avoiding the waste of computer system resources on transaction requests that should not be processed (e.g., fraudulent or malicious transaction requests).

Example Risk Detection System

Figure 1:
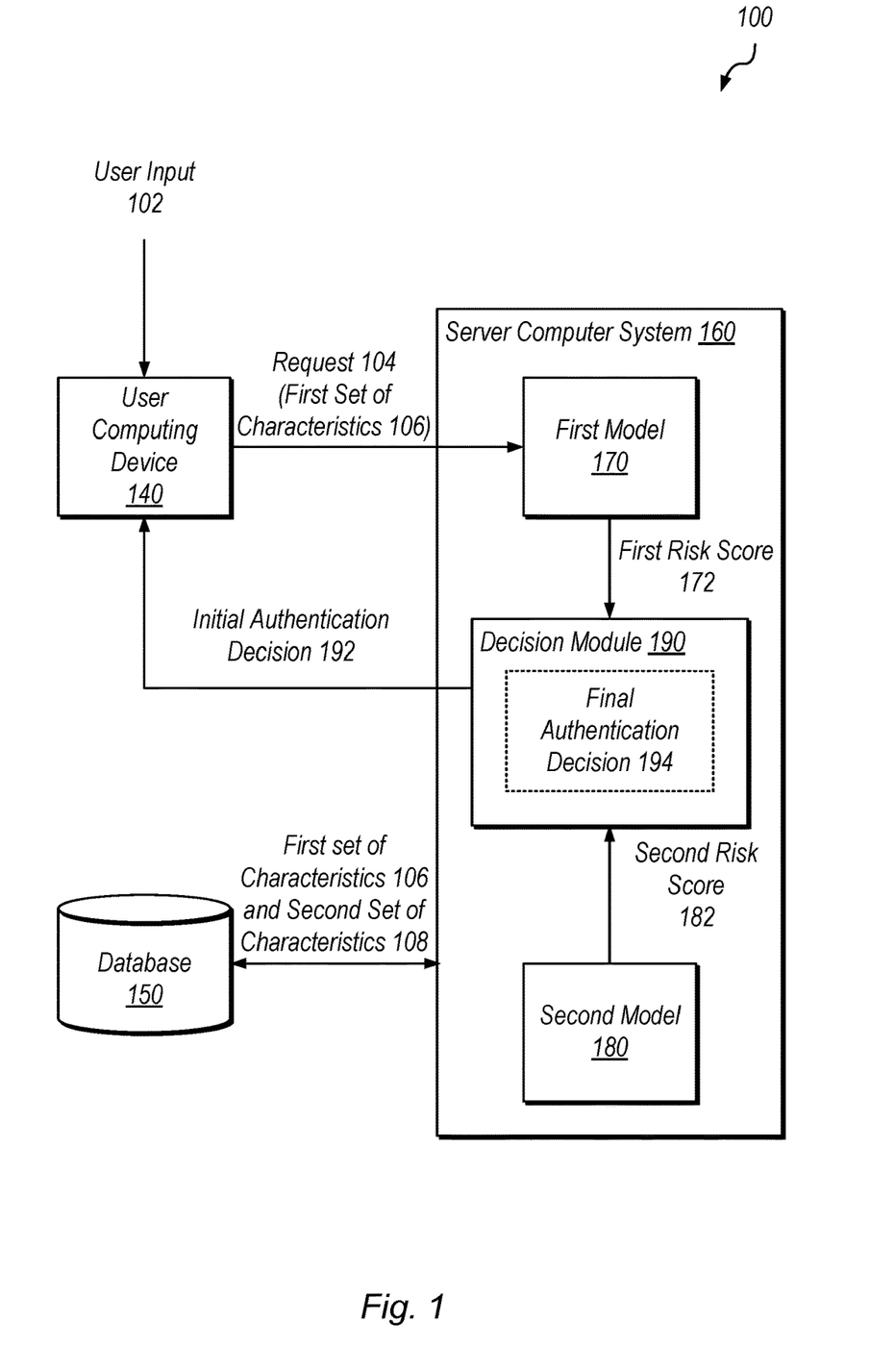
FIG. 1 is a block diagram illustrating an example system configured to perform risk analyses for requests using multiple machine-learning based models, according to some embodiments.

FIG. 1 is a block diagram illustrating an example system configured to perform risk analyses for requests using multiple machine-learning based models. In the illustrated embodiment, system 100 includes a database 150, a user computing device 140, and a server computer system 160, which in turn includes a first model 170, a second model 180, and a decision module 190.

User computing device 140, in the illustrated embodiment, receives user input 102. User input 102 may be a click, swipe, gesture, text, etc. that initiates an electronic transaction, attempts to access to an account, attempts to access information, etc. User computing device 140 sends a request 104 to server computer system 160 in response to receiving the user input 102. The request 104 sent to server computer system 160 is an authentication request that includes a first set of characteristics 106. For example, request 104 may be a request to authenticate a user of user computing device 140. The first set of characteristics 106 includes account credentials (e.g., username, password, email address, phone number, billing address, shipping address, etc.), transaction information (e.g., account number, a time the transaction is initiated, entities involved in the transaction, a location of the transaction, items included in the transaction, a transaction amount, a currency for the transaction, etc.), information associated with the user computing device 140 (e.g., device identifier (ID), hardware specifications, software specification, internet protocol (IP) address, session ID, etc.), information associated with a user of the user account (e.g., typing speed, typing preferences relative to one or more devices used by this account, data from mobile sensors such as typing pressure, etc.), the user agent payload of the request, identification of a transaction received from a virtual machine or via a proxy device, etc.

In response to request 104, user computing device 140 receives an initial authentication decision 192. As one specific example, if request 104 is a request to authenticate a user requesting a transaction, initial authentication decision 192 specifies that the user (that provided user input 102) has been successfully authenticated and, therefore, that the transaction request is authorized. User computing device 140, in this specific example, executes the requested transaction and displays a confirmation message to the user associated with user input 102.

Server computer system 160, in the illustrated embodiment, inputs request 104 and the first set of characteristics 106 into first model 170. First model 170 generates a first risk score 172 for request 104 and outputs this score to decision module 190. First model 170 is a machine-learning based model that executes within a threshold amount of time (e.g., according to service-level agreements). For example, first model 170 may produce first risk score 172 within two to three seconds of server computer system 160 executing the model. First model 170 may be a gradient-boosting machine learning model, a linear-based model, etc. First model may be a simple model, while second model may be a more complex model. Consequently, the first model may finish executing more quickly than the second model. Risk scores output by first model 170 may be classification values on a scale from 0 to 1 (e.g., 0 indicating not fraudulent and 1 indicating fraudulent). In other situations, the classification values output by the first model 170 are on a scale of 0 to 100, 0 to 1000, 0 to 10,000, etc.

In some embodiments, server computer system 160 stores the first set of characteristics 106 in database 150. For example, characteristics associated with request 104 may be stored for use in retraining models 170 and 180, for use in training future machine learning-based models, for use in generating risk scores using a model other than first model 170 (e.g., for use by second model 180), for use in generating risk scores for future requests received from user computing device 140, etc.

Decision module 190, in the illustrated embodiment, receives first risk score 172 and generates initial authentication decision 192 for request 104 based on the first risk score and transmits this decision to user computing device 140. Due to the first model 170 producing a first risk score 172 two to three milliseconds, for example, a user utilizing user computing device 140 will not notice a delay in submitting their input 102 and receiving some sort of response (e.g., based on the initial authentication decision 192), which may advantageously improve user experience. Decision module 190 compares the first risk score 172 to a risk threshold for an account associated with request 104. For example, the risk threshold may be 900, while the first risk score 172 is 800 on a scale from 0 to 1000 (with 0 indicating not fraudulent and 1000 indicating fraudulent). In this example, the first risk score 172 does not satisfy the risk threshold (i.e., is not risky) and, therefore, the initial authentication decision 192 indicates that request 104 is approved.

In addition to inputting request 104 into the first model 170, server computer system 160 inputs request 104 into a second model 180. Server computer system 160 inputs both the first set of characteristics 106 associated with request 104 and a second, different set of characteristics 108, retrieved from database 150, into second model 180. The second, different set of characteristics 108 may include hundreds of attributes associated with an account of a user submitting user input 102. For example, a user of user computing device 140 may submit a request for a transaction from their account (e.g., a PAYPAL account). In this example, the second, different set of characteristics 108 includes a transaction history, account login history, prior user activity via a user account, device activity for user computing device 140 (e.g., location history), etc. Further, the second set of characteristics 108 may include recent changes made to a user account, such as the addition of a payment option on the account, a change in language preferences, a change in email address, a change in physical address, a change in phone number, etc.

Second model 180, in the illustrated embodiment, generates a second risk score 182 for request 104. In some embodiments, second risk score 182 is output on the same scale as first risk score 172. For example, first risk score 172 and second risk score 182 are both output on a scale of 0 to 1. In some embodiments, second risk score 182 differs from first risk score 172. For example, first risk score 172 may be 0.2 (e.g., indicating not fraudulent), while second risk score 182 is 0.8 (e.g., indicating fraudulent).

In some embodiments, server computer system 160 inputs the second set of characteristics 108 into first model 170 in addition to second model 180. In such embodiments, server computer system 160 retrieves the second set of characteristics 108 from database 150 and inputs these characteristics into first model 170 in response to receiving request 104. For example, first model 170 may generate first risk score 172 based on both the first set of characteristics 106 and the second set of characteristics 108.

Decision module 190, in the illustrated embodiment, generates a final authentication decision 194 based on the second risk score 182 generated by second model 180. Similar to generating the initial authentication decision 192, decision module 190 may compare the second risk score 182 to a risk threshold (either the same or a different risk threshold used to compare the first risk score 172). Based on the second risk score 182 meeting the risk threshold (e.g., indicating that a transaction request is risky), decision module 190 generates a final authentication decision 194 indicating that request 104 is rejected.

Four scenarios exist for the first and second risk scores 172 and 182. Both scores indicate that request 104 is risky, both scores indicate that request 104 is not risky, the first risk score 172 indicates that request 104 is risky while the second risk score 182 indicates that request 104 is not risky, or the first risk score 172 indicates that request 104 is not risky while the second risk score 182 indicates that request 104 is risky. In situations in which the first and second risk scores 172 and 182 both indicate risk, however, the second risk score 182 and the first risk score 172 may differ. For example, the first risk score 172 may be 0.8 (on a scale of 0 to 1), indicating that request 104 is highly risky, while the second risk score 182 may be 0.7, indicating that the request is risky but not as risky as indicated by the first model 170. In this example, however, both scores surpass a risk threshold of 0.6. As such, in this example, the initial authentication decision 192 and the final authentication decision 194 generated by decision module 190 will indicate that request 104 is rejected (e.g., the authentication failed). In other situations, the first risk score 172 indicates that the request 104 is not fraudulent, while the second risk score 182 indicates that request 104 is fraudulent. In such situations, decision module 190 may include preventative actions in the final authentication decision 194 for user computing device 140 (e.g., rollback transactions that were approved based on the initial authentication decision 192). This example situation is discussed in further detail below with reference to FIG. 4.

In some embodiments, server computer system 160 executes the first model 170 and the second model 180 in parallel. For example, there may be some overlap in the execution of the two models 170 and 180. In the parallel embodiment, server computer system 160 may execute first model 170 and, then, while the first model 170 is still executing, the server computer system 160 may begin to execute the second model 180. As another example, server computer system 160 may execute the first and second model at the same time, but the first model 170 finishes executing before the second model 180. In other embodiments, the server computer system 160 executes the first model 170 and then waits to execute the second model 180 until the first model 170 has finished executing (e.g., outputs the first risk score 172).

In some embodiments, server computer system 160 trains the first model 170 and second model 180 using data stored in database 150 gathered from various different requests received from a plurality of user computing devices. In other embodiments, server computer system 160 receives first model 170 and second model 180 from another server computer system configured to train the models using previously gathered account and transaction characteristics. In some embodiments, the training of models 170 and 180 is performed in an offline environment (e.g., prior to evaluating requests from user computing devices). For example, models 170 and 180 may be trained using historical account, transaction, etc. data gathered from various interactions with different user computing devices. The historical data may include account information, transaction information, device information, location information, banking information, etc. This historical data may be retrieved from a large datastore maintained by server computer system 160.

In some embodiments, a server computer system trains models 170 and 180 using supervised machine learning techniques. During training, the server computer system inputs feature engineered variables (such as the variables included in the first and second sets 106 and 108 of characteristics discussed above). After these models are trained, they are released into production (i.e., used to predict risk) and are monitored by the server computer system. If, for example, the catch rates of these models shift more than a threshold amount, the server computer system may flag the models for retraining. As one specific example, server computer system uses a set of 100 previously completed transactions to train models 170 and 180. These transactions include respective sets of variables such as a transaction amount, transaction type, user account initiating the transaction etc. as well as a label (e.g., fraudulent or not fraudulent). After training is complete using the set of 100 transactions, the server computer system launches these transactions for classification of newly submitted transactions. If, in this specific example, one or both of the models 170 and 180 show a catch rate of less than a catch rate threshold of 97%, then the server computer system may retrain the models by inputting new augmented training data or simply reusing old training data (e.g., prior labeled transactions) and adjusting model weights. Note that both models 170 and 180 may be compared to the same catch rate threshold, or may be compared to different catch rate thresholds. In addition, the two models 170 and 180 may be retrained using the same or different training data.

In situations in which models 170 and 180 provide conflicting output, one or both of the models may be retrained. For example, if the first model 170 is highly confident that a transaction request is not fraudulent (e.g., outputs a score of 0.1), but the second model 180 is highly confident that the transaction request is fraudulent (e.g., outputs a score of 0.95), server computer system 160 (or another system) may retrain one or both of the models. Note that, although the models may have differing scores due to the second model 180 having a greater amount and diversity of inputs, if the output of these two models differs more than a threshold amount, retraining may be necessary as discussed above with reference to catch rate thresholds.

In this disclosure, various "modules" operable to perform designated functions are shown in the figures and described in detail (e.g., decision module 190, tier module 310, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

Example Risk Analysis Timeline

Figure 2:
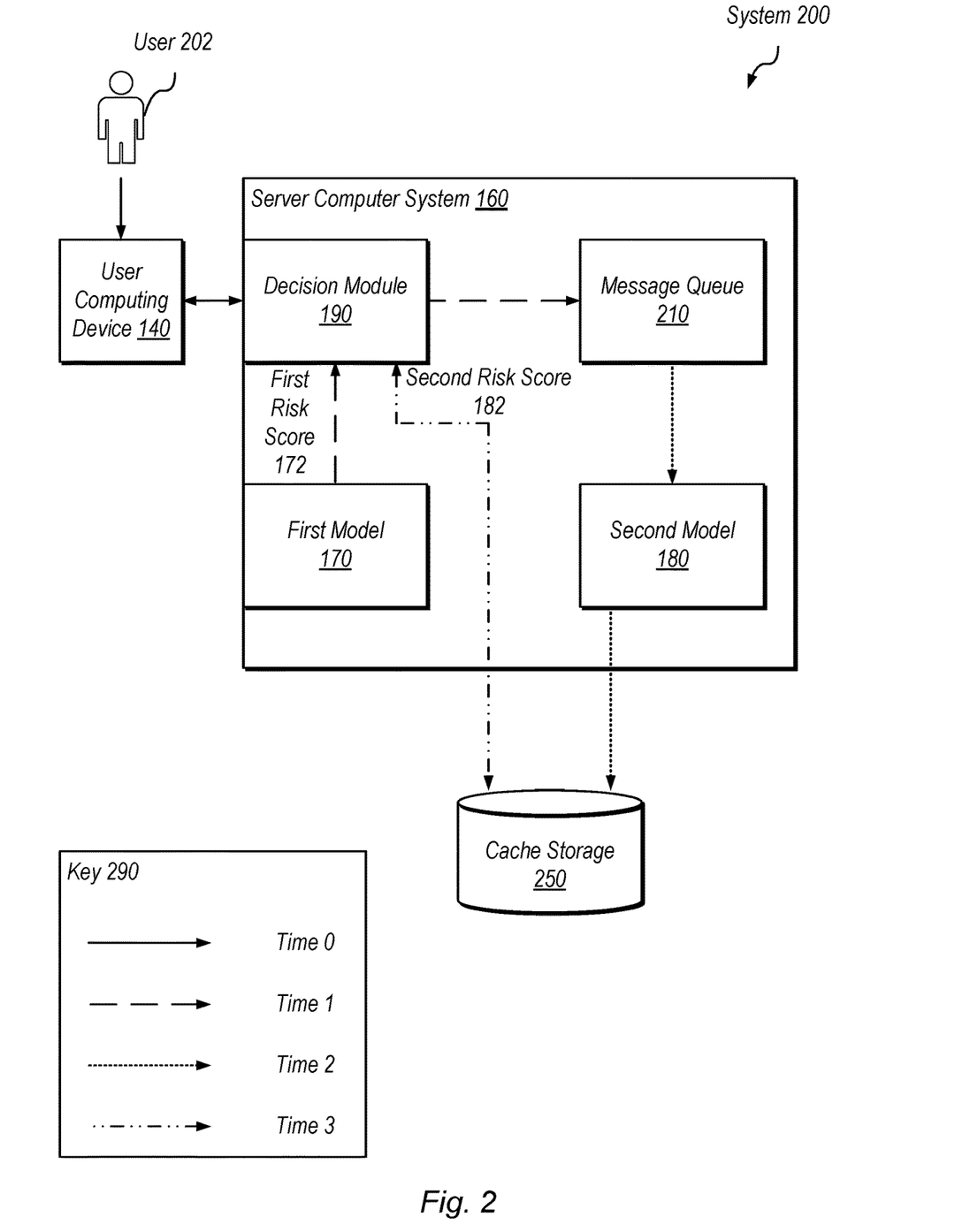
FIG. 2 is a block diagram illustrating an example timeline for a multi-model risk analysis, according to some embodiments.

Turning now to FIG. 2, a block diagram is shown illustrating an example timeline for a multi-model risk analysis. In the illustrated embodiment, a key 290 is shown for the timing of the multi-model risk analysis executed by a system 200 based on input from user 302. System 200 includes user computing device 140, server computer system 160, and cache storage 250.

User computing device 140, in the illustrated embodiment, receives input from user 202 and sends a request to server computer system 160 based on the input at time 0, according to key 290. At time 1, server computer system 160 executes first model 170, and model 170 sends a first risk score to decision module 190. In addition, at time 0, decision module 190 publishes a payload to message queue 210, the payload including the first risk score 172 and a set of characteristics associated with the request from user computing device 140. In some embodiments, decision module 190 publishes payloads to message queue 210 using session IDs. A session ID in the context of this disclosure include a unique identifier of a session established between a user device and a transaction processing server (e.g., PAYPAL server) for processing of one or more transactions. A score for a given user request may be posted to the message queue with a corresponding session ID. For example, the second model 180 knows which user request it is currently evaluating based on the session ID and is able store a second risk score in cache storage 250 with this session ID. Further, in this example, decision module 190 is able to recall the second risk score from cache storage 250 for the request using the appropriate session ID.

Message queue 210 may be a messaging queue provided by Kafka™, ActiveMQ™, RabbitMQ™, etc. In some embodiments, server computer system 160 stores the first risk score 172 and characteristics associated with the request from user computing device 140 using an implementation other than message queue 210. For example, system 160 may implement a database maintained by another server system that stores the first risk score 172 and corresponding characteristics. In this example, server computer system 160 make a service call to the other service to retrieve the information stored in the database for use when executing the second model 180. As another example, system 160 may post output of the first model via an application programming interface (API) endpoint.

In addition to storing the first risk score 172 and characteristics in message queue 210, decision module 190 makes an initial decision (e.g., deny a login request received from user 202) for the request from device 140 based on the first risk score 172 and transmits the decision to user computing device 140. Second model 180, in the illustrated embodiment, begins a more complex risk analysis for the request from user computing device 140 (e.g., than the analysis completed by first model 170) based on receiving a message from message queue 210 that includes the characteristics associated with the request (the second set 108 of characteristics). The analysis implemented by the second model 180 is performed at time 2, according to key 290.

As one specific example, time 2 occurs ten seconds after time 1. Once second model 180 is finished completing its complex analysis (e.g., approximately 1-5 seconds), server computer system 160 stores the output of the analysis (i.e., second risk score 182) in cache storage 250. In some embodiments, server computer system 160 sends the output of second model 180 directly to decision module 190 without storing the output in cache storage 250. For example, in some situations, there may not be a queue of authentication requests from a plurality of different user computing devices awaiting evaluation by decision module 190. In this situation, a present authentication request is immediately evaluated by decision module 190 without needing to temporarily store a second risk score for this request in cache storage 250.

In some embodiments, the analysis implemented by second model 180 is performed based on characteristics collected during a current session between user computing device 140 and server computer system 160. For example, characteristics associated with user actions taken from time 1 to time 2 may be recorded by server computer system 160 and input to second model 180 in addition to characteristics sent from message queue 210 to the second model. As one specific example, if user 202 is initiating suspicious transactions via user computing device 140 after the first risk score 172 and initial authentication decision is generated (i.e., after user 202 is granted access to their account), this information is considered by second model 180 when performing a risk analysis of the request received from user computing device 140 for user 202.

In some embodiments, cache storage 250 is a key-value store. For example, server computer system 160 may store a second risk score 182 output by second model 180 in cache storage 250 by generating a new entry with a session ID as the key for the entry and the second risk score 182 as the value for this entry. In this way, decision module 190 is able to quickly retrieve the second risk score 182 from cache storage 250 using the session ID. The session ID is an identifier of a session established between user computing device 140 and server computer system 160 based on the request (e.g., request 104 as shown in FIG. 1) sent from device 140 to system 160 for authentication. Cache storage 250 may be executed by system 200 using an Aerospike™ cluster.

Decision module 190, in the illustrated embodiment, retrieves the second risk score 182 from cache storage 250 at time 3. Based on the second risk score 182, decision module 190 makes a final decision (e.g., to rollback any actions taken by user 202 at user computing device 140 since the initial decision was made) and communicates this decision to user computing device 140.

Example Tier Module

Figure 3:
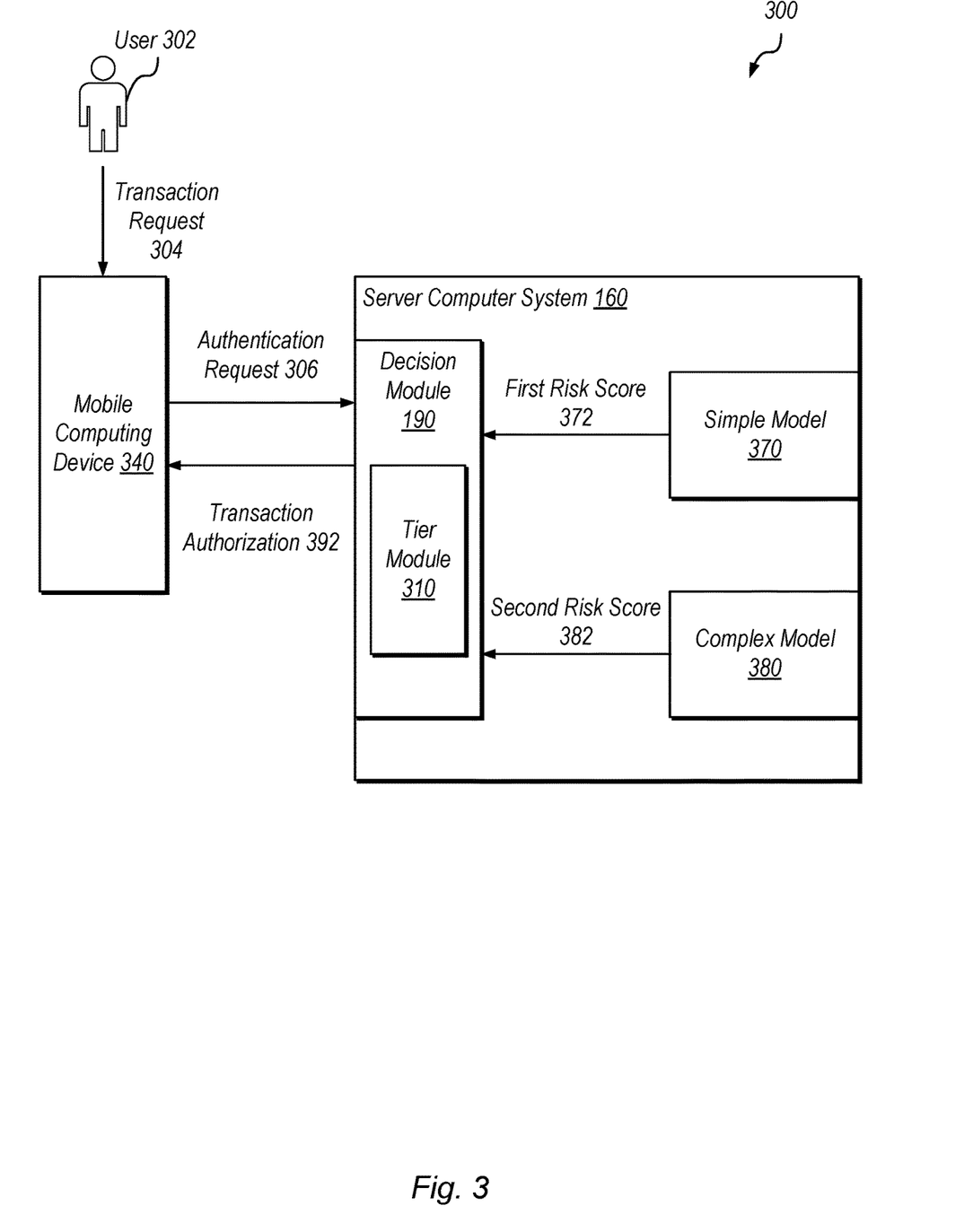
FIG. 3 is a block diagram illustrating an example tier module, according to some embodiments.

FIG. 3 is a block diagram illustrating an example tier module. In the illustrated embodiment, user 302 interacts with system 300 which includes mobile computing device 340 and server computer system 160, which in turn includes decision module 190, tier module 310, simple model 370, and complex model 380.

Mobile computing device 340, in the illustrated embodiment, receives a request to initiate a transaction from user 302. Mobile computing device 340 may be a cell phone, wearable device, tablet, etc. The transaction may be an electronic monetary transaction, an exchange of goods and services, a non-monetary transaction, etc. Mobile computing device 340 sends an authentication request 306 to server computer system 160 for the requested transaction. Authentication request 306 includes characteristics for the requested transaction, characteristics of the user account from the transaction was initiated, characteristics of mobile computing device 340, etc.

Server computer system 160, in the illustrated embodiment, executes simple model 370 (one example of first model 170 shown in FIG. 1) to determine a first risk score 372 for authentication request 306. Server computer system 160 then executes decision module 190 to determine whether to authorize the transaction indicated in request 304. Specially, decision module 190 executes tier module 310 to determine a tier for an account accessed by user 302 to initiate the requested transaction.

Tier module 310 determines tiers for user accounts based on various characteristics of these accounts. In some embodiments, user accounts are associated with different sets of limitations. For example, a first user account that is designated as a tier one account might be allowed to operate in an unrestricted mode, while a second user account that is designated as a tier two account might have restrictions on the type of activity allowed within the account. As one specific example, a user of a tier one account might be able to complete transactions, while a user of a tier two account is allowed to view their account but is not able to complete transactions using their account. In this specific example, the tier two account has restrictions based on this account having a history of suspicious activity.

In some embodiments, tier module 310 determines and assigns tiers to user accounts based on characteristics included in authentication request 306. For example, tier module 310 may determine and assign tiers based on the first set of characteristics 106 discussed above with reference to FIG. 1. In other embodiments, tier module 310 determines and assigns tiers to user accounts based on additional characteristics. For example, tier module 310 may determine and assign tiers based on the first set of characteristics 106 and the second set of characteristics 108 discussed above with reference to FIG. 1.

In some embodiments, a particular tier assigned to a user account is associated with transaction restrictions. For example, the transaction restrictions indicate to allow initiation of transactions via the user account and indicate to prohibit authorization of transactions prior to determining the final authentication decision 194 (discussed above with reference to FIG. 1). For example, if authentication request 304 is received from a mobile application downloaded on a mobile device, tier module 310 may assign this user account to a different tier than if user request 304 was initiated from a web browser on a desktop computer. Similar evaluations may be made based on the lifespan of a given user's account, types of transaction initiated, locations from which the requests are being made, etc. Said another way, in addition using various user, device, etc. characteristics to determine risk scores via two different models, the disclosed techniques use these characteristics to determine tiers (and corresponding risk thresholds) for evaluating risk scores for authentication requests.

In the illustrated embodiment, simple model 370 sends first risk score 372 for transaction request 304 to decision module 190. Decision module 190 executes tier module 310 to determine a tier for an account from which the transaction was initiated. Based on the tier output by tier module 310, decision module 190 determines to authorize the requested transaction and sends transaction authorization 392 to mobile computing device 340. In response to this authorization, mobile computing device 340 completes the requested transaction and displays a confirmation message to user 302 via a user interface of device 340.

In addition to executing simple model 370, server computer system 160 executes complex model 380 to determine a second risk score 382 for authentication request 306. Based on the second risk score 382, decision module 190 makes a second authorization decision. For example, decision module 190 may determine, based on second risk score 382 and the tier determined by module 310, that the authorized transaction should be rolled back. Said another way, decision module 190 may determine that the transaction is actually fraudulent and, based on this determination, send a rollback command (not shown) to mobile computing device 340. In such situations, mobile computing device 340 may reverse the completed transaction and display a message to user 302 indicating that the transaction has been reversed. In other situations, mobile computing device 340 reverses the transaction without notifying the user 302. In some embodiments, the rollback command sent from system 160 to mobile computing device 340 also indicates to revoke user access to their account (e.g., based on this user being suspicious and initiating a fraudulent transaction).

In some embodiments, based on the tier determined by tier module 310 for a user account, decision module 190 sends an authorization decision to mobile computing device 340 that specifies to limit a user's activity within their account even when the first risk score 372 indicates that the user's request is not risky. For example, a tier two user may be allowed to access their account, but are not able to complete transactions unless the second risk score 382 indicates their transaction requests are not risky. In this example, if the second risk score 382 indicates that request 304 is not risky, decision module 190 may authorize a transaction request for the tier two user even though they were not authorized to complete this transaction based on the first risk score 372. Said another way, transactions may not be authorized during a period of uncertainty falling between completion of the simple model 370 and completion of the complex model 380. For example, the output of the second model may be given greater weight in authentication decisions than the output of the first mode.

In some embodiments, decision module 190 implements different sets of rules when evaluating authentication requests from different tiers of user accounts. For example, risk scores for requests from a tier one account might be evaluated using a lower threshold than risk scores for requests from a tier two account. As one specific example, requests from a user who has recently made a change to their account (e.g., changed their email address, shipping address, billing information, etc.) might be evaluated using a higher risk threshold since such changes indicate potentially fraudulent activity.

Figure 4:
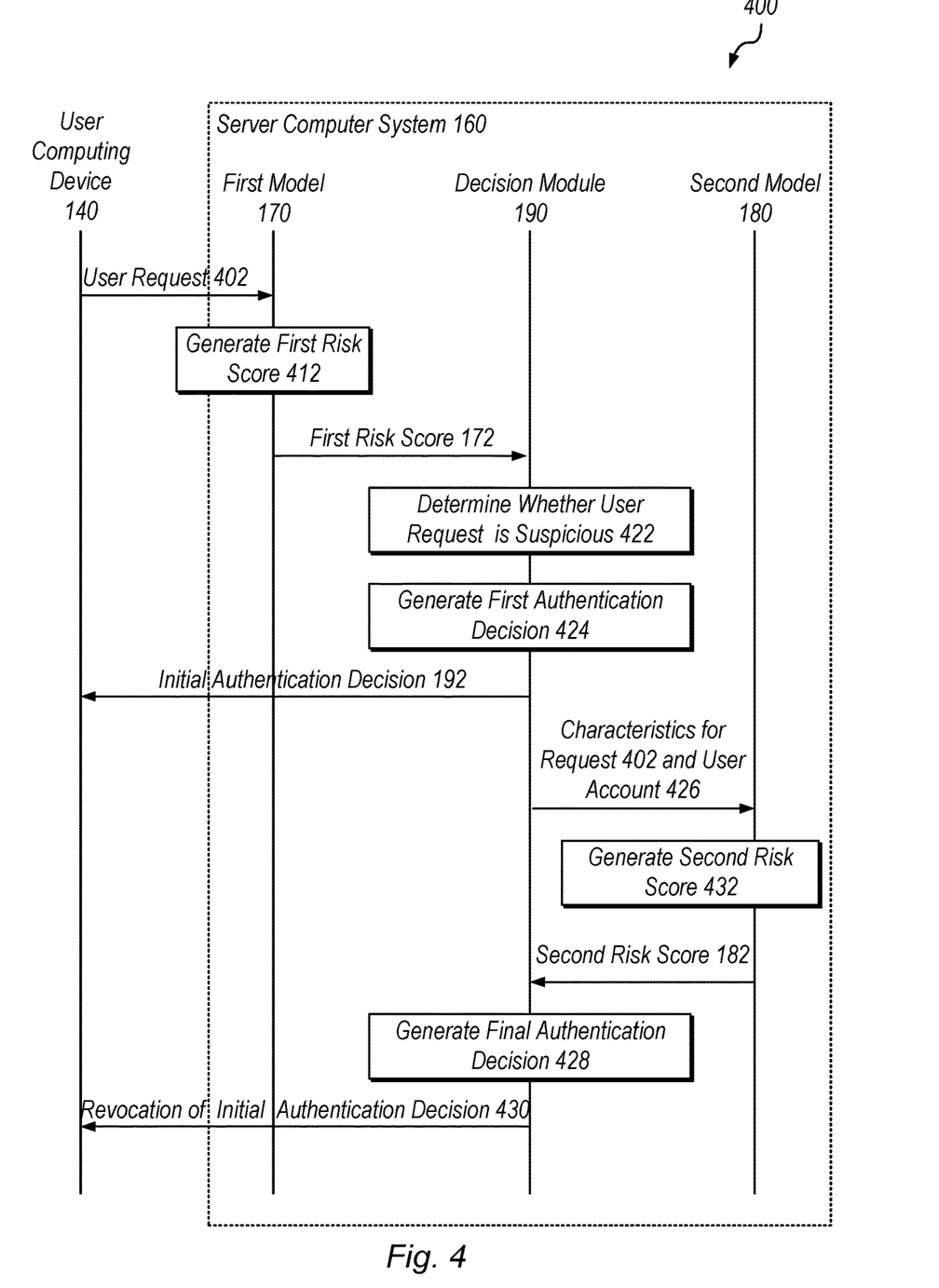
FIG. 4 is a diagram illustrating an example multi-model risk analysis, according to some embodiments.

FIG. 4 is a diagram illustrating an example multi-model risk analysis. In the illustrated embodiment, example 400 shows the flow of communication between user computing device 140 and server computer system 160 during evaluation of a user request.

In the illustrated embodiment, user computing device 140 sends user request 402 to first model 170. User request 402 is generated at user computing device 140 by a user accessing an account and initiating a transaction from their account. As one specific example, a user may log into their account via a PAYPAL application downloaded on their mobile device (one example of user computing device 140).

At element 412, first model 170 generates a first risk score based on characteristics associated with user request 402. For example, user request 402 may include information about the transaction requested by the user, such as a transaction amount, a merchant, banking information of the user requesting the transaction, etc. In the illustrated embodiment, first model 179 sends the first risk score 172 to decision module 190.

At element 422, decision module 190 determines whether user request 402 is suspicious based on the first risk score 172. For example, decision module 190 may compare the first risk score 172 to a risk threshold for the user account associated with request 402. If the first risk score 172 meets the risk threshold, then decision module 190 determines that the user request 402 is risky (and may be fraudulent).

At element 424, decision module 190 generates a first authentication decision. For example, based on determining that user request 402 is risky, decision module 190 generates a decision indicating that this request 402 failed an authentication evaluation and is, therefore, rejected. For example, if user request 402 is a transaction request, the decision generated at element 424 indicates that this transaction is denied. Decision module 190 sends the first authentication decision 192 to user computing device 140. In addition, decision module 190 sends characteristics associated with user request 402 and characteristics associated with an account 426 of the user of user computing device 140 to second model 180.

At element 432, second model 180 generates a second risk score for user request 402. The second risk score generated at element 432 may be different than the first risk score 172. Second model 180 sends second risk score 182 to decision module 190 in the illustrated embodiment.

At element 428, decision module 190 generates a final authentication decision for user request 402 based on second risk score 182. Decision module 190 sends a revocation command 430 to user computing device 140 based on the final authentication decision. Based on the second risk score 182, decision module 190 determines that the user request 402 is fraudulent and decides to revoke the initial authentication decision 192 made based on first risk score 172.

The revocation command may indicate to rollback actions taken in a given user session (e.g., initiated transactions, accessed data, etc.), prevent the user from performing one or more actions, prevent access to certain data, or limit the actions of a user within their account in some way. For example, if the revocation command specifies to rollback a transaction, user computing device 140 may refund a purchase instrument (e.g., credit card, debit account, etc.) used during the transaction. In some embodiments, the revocation command includes a request for additional authentication information. For example, user computing device 140 may request that a user provide additional authentication factors before allowing the user to continue accessing their account. In this example, if the user is unable to provide the appropriate authentication factors, the server computer system 160 flags the user account as suspicious. As another example, the revocation command specifies to log the user out of their account.

Example Method

Figure 5:
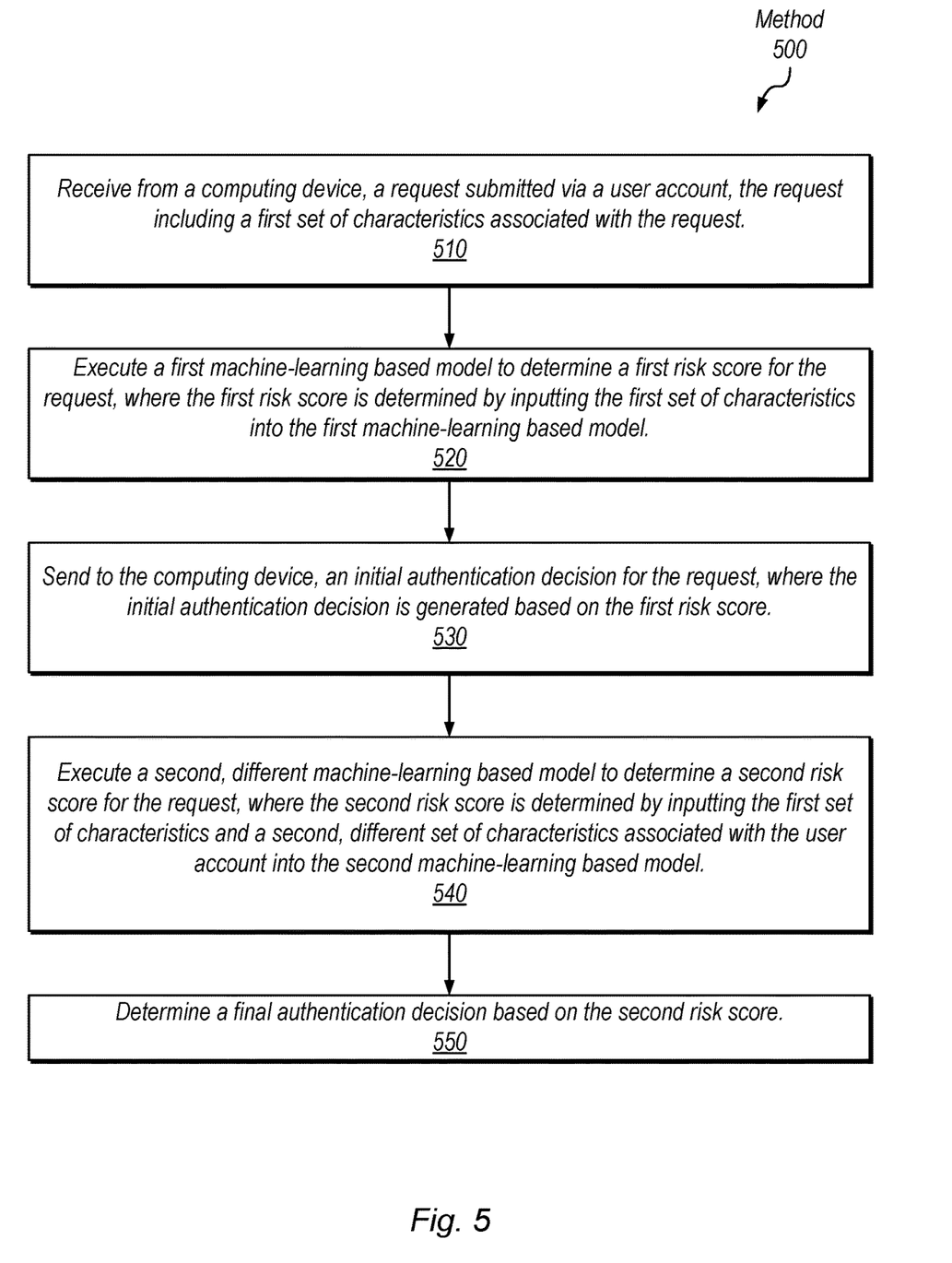
FIG. 5 is a flow diagram illustrating a method for evaluating a request using two different machine-learning based models, according to some embodiments.

FIG. 5 is a flow diagram illustrating a method 500 for training a machine learning model using embedded transaction data, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, server computer system 160 performs the elements of method 500.

At 510, in the illustrated embodiment, a server computer system receives, from a computing device, a request submitted via a user account, the request including a first set of characteristics associated with the request.

At 520, the server computer system executes a first machine-learning based model to determine a first risk score for the request, where the first risk score is determined by inputting the first set of characteristics into the first machine-learning based model. In some embodiments, the first machine-learning based model is a linear model that is executed within a threshold amount of time, where the second machine-learning based model is a complex neural network. In some embodiments, the server computer system publishes, to a message queue, a message including the first set of characteristics, where the published first set of characteristics is available for input to the second machine-learning based model, where the message queue stores one or more sets of characteristics for a plurality of different requests from a plurality of different user accounts.

At 530, the server computer system sends, to the computing device, an initial authentication decision for the request, where the initial authentication decision is generated based on the first risk score. In some embodiments, the initial authentication decision includes one or more restrictions for the user account, where the one or more restrictions specify to limit activity of a user of the user account at least until the server computer system determines the final authentication decision. For example, a user may be given access to their account with one or more limitations on the types of activity allowed within their account at least until further authentication can be performed. In some embodiments, the server computer system determines the one or more restrictions for the user account by evaluating activity of the user account that occurred within a threshold amount of time and assigning the user account to a particular tier of a set of account tiers, where respective account tiers in the set of account tiers are associated with different numbers and types of restrictions.

At 540, the server computer system executes a second, different machine-learning based model to determine a second risk score for the request, where the second risk score is determined by inputting the first set of characteristics and a second, different set of characteristics associated with the user account into the second machine-learning based model. In some embodiments, the first machine-learning based model and the second machine-learning based model are executed in parallel. In other embodiments, the second model is executed after the first model has completed executing.

In some embodiments, the server computer system stores, in a database, the second risk score for use in determining the final authentication decision, where the database is a key-value store. In some embodiments, storing the second risk score includes storing a session identifier (ID) for the user account as a key and the second risk score as a value corresponding to the key.

At 550, the server computer system determines a final authentication decision based on the second risk score. In some embodiments, the request is for a transaction, wherein the initial authentication decision for the request authorizes the transaction, and wherein the final authentication decision includes a rollback decision for the transaction. For example, the server computer system may roll back a transaction due to the second model identifying the transaction as fraudulent even though the first model did not identify it as fraudulent.

In some embodiments, the server computer system performs, based on the final authentication decision indicating to revoke the initial authentication decision, a rollback procedure for the user account, where the rollback procedure includes reversing one or more actions taken by a user from the time the initial authentication decision was sent to the computing device to the time the server computer system determines the final authentication decision. For example, the second risk score may indicate that the request is suspicious. In some embodiments, the user request is for a transaction, where the initial authentication decision for the user request authorizes the transaction. In some embodiments, the final authentication decision includes a rollback decision for the transaction. In some embodiments, the server computer system performs additional authentication procedures based on the output of the second model. In some embodiments, the disclosed techniques may advantageously prevent or reduce loss (e.g., financial loss) associated with requests for a computer system (e.g., transactions, for account access, etc.).

Example Computing Device

Figure 6:
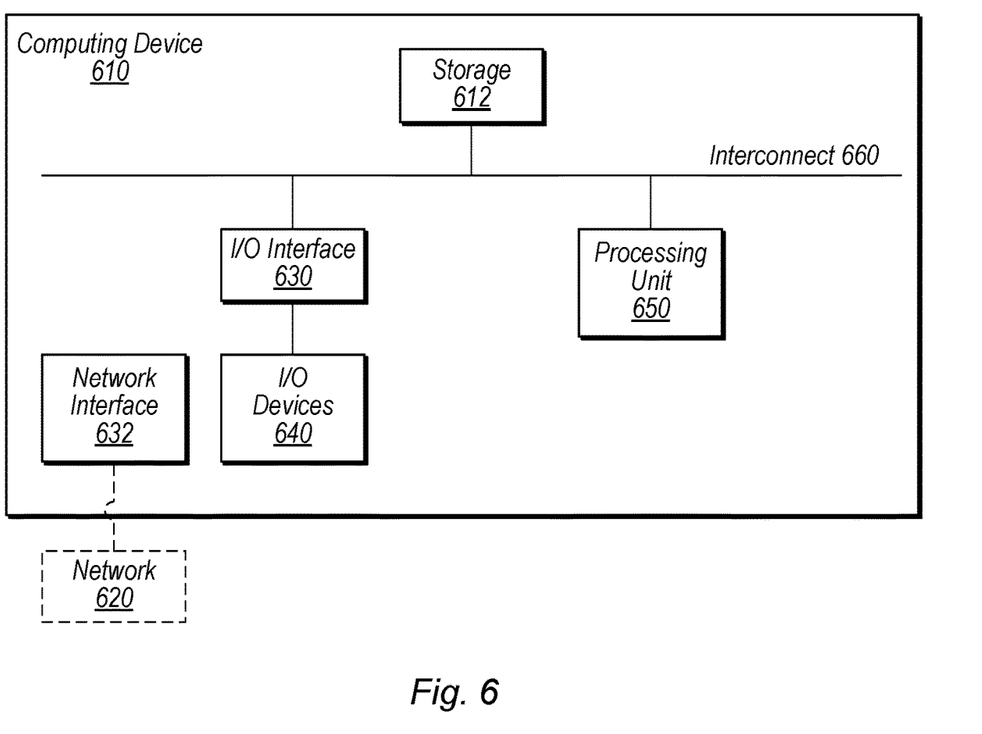
FIG. 6 is a block diagram illustrating an example computing device, according to some embodiments.

Turning now to FIG. 6, a block diagram of one embodiment of computing device 610 (which may also be referred to as a computing system) is depicted. Computing device 610 may be used to implement various portions of this disclosure. Computing device 610 may be any suitable type of device, including, but not limited to, a personal computer system, desktop computer, laptop or notebook computer, mainframe computer system, web server, workstation, or network computer. The server computing system 160 shown in FIG. 1 and discussed above is one example of computing device 610. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 612 may consist solely of volatile memory, in one embodiment. Database 150, discussed above with reference to FIG. 1 is one example of storage subsystem 612. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

receiving, by a server computer system from a computing device, a request submitted via a user account, the request including a first set of characteristics associated with the request;

executing, by the server computer system, a first machine-learning based model to determine a first risk score for the request, wherein the first risk score is determined by inputting the first set of characteristics into the first machine-learning based model;

sending, by the server computer system to the computing device, an initial authentication decision for the request, wherein the initial authentication decision is generated based on the first risk score;

executing, by the server computer system after sending the initial authentication decision, a second, different machine-learning based model to determine a second risk score for the request, wherein the second risk score is determined by inputting the first set of characteristics and a second, different set of characteristics associated with the user account into the second machine-learning based model;

storing, by the server computer system in a key-value store, the second risk score with a corresponding session identifier (ID) as a key in the key-value store; and determining, by the server computer system based on the second risk score, a final authentication decision.

2. The method of claim 1, wherein the first machine-learning based model and the second machine-learning based model are executed in parallel.

3. The method of claim 1, wherein the request is for a transaction, wherein the initial authentication decision for the request authorizes the transaction, and wherein the final authentication decision includes a rollback decision for the transaction.

4. The method of claim 1, wherein the initial authentication decision includes one or more restrictions for the user account, and wherein the one or more restrictions specify to limit activity of a user of the user account at least until the server computer system determines the final authentication decision.

5. The method of claim 4, wherein the server computer system determines the one or more restrictions for the user account by:
evaluating activity of the user account that occurred within a threshold amount of time; and
assigning the user account to a particular tier of a set of account tiers, wherein respective account tiers in the set of account tiers are associated with different numbers and types of restrictions.

6. The method of claim 1, further comprising:
performing, by the server computer system based on the final authentication decision indicating to revoke the initial authentication decision, a rollback procedure for the user account, wherein the rollback procedure includes reversing one or more actions taken by a user from the time the initial authentication decision was sent to the computing device to the time the server computer system determines the final authentication decision.

7. The method of claim 1, wherein the first machine-learning based model is a linear model that is executed within a threshold amount of time, and wherein the second machine-learning based model is a complex neural network.

8. The method of claim 1, further comprising:
publishing, by the server computer system to a message queue, a message including the first set of characteristics, wherein the published first set of characteristics is available for input to the second machine-learning based model, wherein the message queue stores one or more sets of characteristics for a plurality of different requests from a plurality of different user accounts.

9. A non-transitory computer-readable medium having program instructions stored thereon that are executable by a server computer system to perform operations comprising:
performing, in response to receiving a user request from a user computing device via a user account, an authentication procedure for the user request, wherein performing the authentication procedure includes:
executing, prior to approving the user request, a first machine-learning based model to determine a first risk score, wherein executing the first machine-learning based model includes inputting a set of request characteristics associated with the user request into the first machine-learning based model;

sending, to the user computing device, an initial authentication decision for the user request, wherein the initial authentication decision is generated based on the first risk score;

executing, after sending the initial authentication decision, a second, different machine-learning based model to determine a second risk score for the user request, wherein the second risk score is determined by inputting the set of request characteristics and a set of account characteristics associated with the user account into the second machine-learning based model;

storing, by the server computer system in a key-value store, the second risk score with a corresponding session identifier (ID) as a key in the key-value store; and determining, based on the second risk score, a final authentication decision.

10. The non-transitory computer-readable medium of claim 9, wherein the second machine-learning based model is executed after execution of the first machine-learning based model is complete.

11. The non-transitory computer-readable medium of claim 9, wherein the user request is for a transaction, wherein the initial authentication decision for the user request authorizes the transaction, and wherein the final authentication decision includes a rollback decision for the transaction.

12. The non-transitory computer-readable medium of claim 9, wherein the initial authentication decision includes one or more restrictions for the user account, and wherein the one or more restrictions included in the initial authentication decision specify to limit activity of a user of the user account at least until the server computer system determines the final authentication decision.

13. The non-transitory computer-readable medium of claim 9, wherein the operations further comprise:
performing, based on the final authentication decision differing from the initial authentication decision, an additional authentication procedure, wherein the additional authentication procedure includes requesting an additional authentication factor from a user of the user computing device.

14. The non-transitory computer-readable medium of claim 9, wherein the first machine-learning based model is a linear model that is executed within a threshold amount of time, and wherein the second machine-learning based model is a neural network.

15. A system, comprising:
at least one processor; and
a memory having instructions stored thereon that are executable by the at least one processor to cause the system to:
receive, from a computing device, a request submitted via a user account, the request including a first set of characteristics associated with the request;
execute a first machine-learning based model to determine a first risk score for the request, wherein the first risk score is determined by inputting the first set of characteristics into the first machine-learning based model;
send, to the computing device, an initial authentication decision for the request, wherein the initial authentication decision is generated based on the first risk score;

execute, after sending the initial authentication decision, a second, different machine-learning based model to determine a second risk score for the request, wherein the second risk score is determined by inputting the first set of characteristics and a second, different set of characteristics associated with the user account into the second machine-learning based model;

store, in a key-value store, the second risk score with a corresponding session identifier (ID) as a key in the key-value store; and determine, based on the second risk score, a final authentication decision.

16. The system of claim 15, wherein the first machine-learning based model and the second, different machine-learning based model are executed in parallel.

17. The system of claim 15, wherein the initial authentication decision includes one or more restrictions for the user account, and wherein the one or more restrictions included in the initial authentication decision specify to limit activity of a user of the user account at least until the system determines the final authentication decision.

18. The system of claim 15, wherein the instructions are further executable by the at least one processor to cause the system to:

perform, based on the final authentication decision indicating to revoke the initial authentication decision, a rollback procedure for the user account, wherein the rollback procedure includes reversing one or more actions taken by a user from the time the initial authentication decision was sent to the computing device to the time the system determines the final authentication decision.

19. The system of claim 15, wherein the instructions are further executable by the at least one processor to cause the system to:

publish, to a message queue, a message including the first set of characteristics, wherein the published first set of characteristics is available for input to the second machine-learning based model, wherein the message queue stores one or more sets of characteristics for a plurality of different requests from a plurality of different user accounts.

20. The system of claim 15, wherein the request is for a transaction, wherein the initial authentication decision for the request authorizes the transaction, and wherein the final authentication decision includes a rollback decision for the transaction.

* * * * *